Patented Mar. 1, 1938

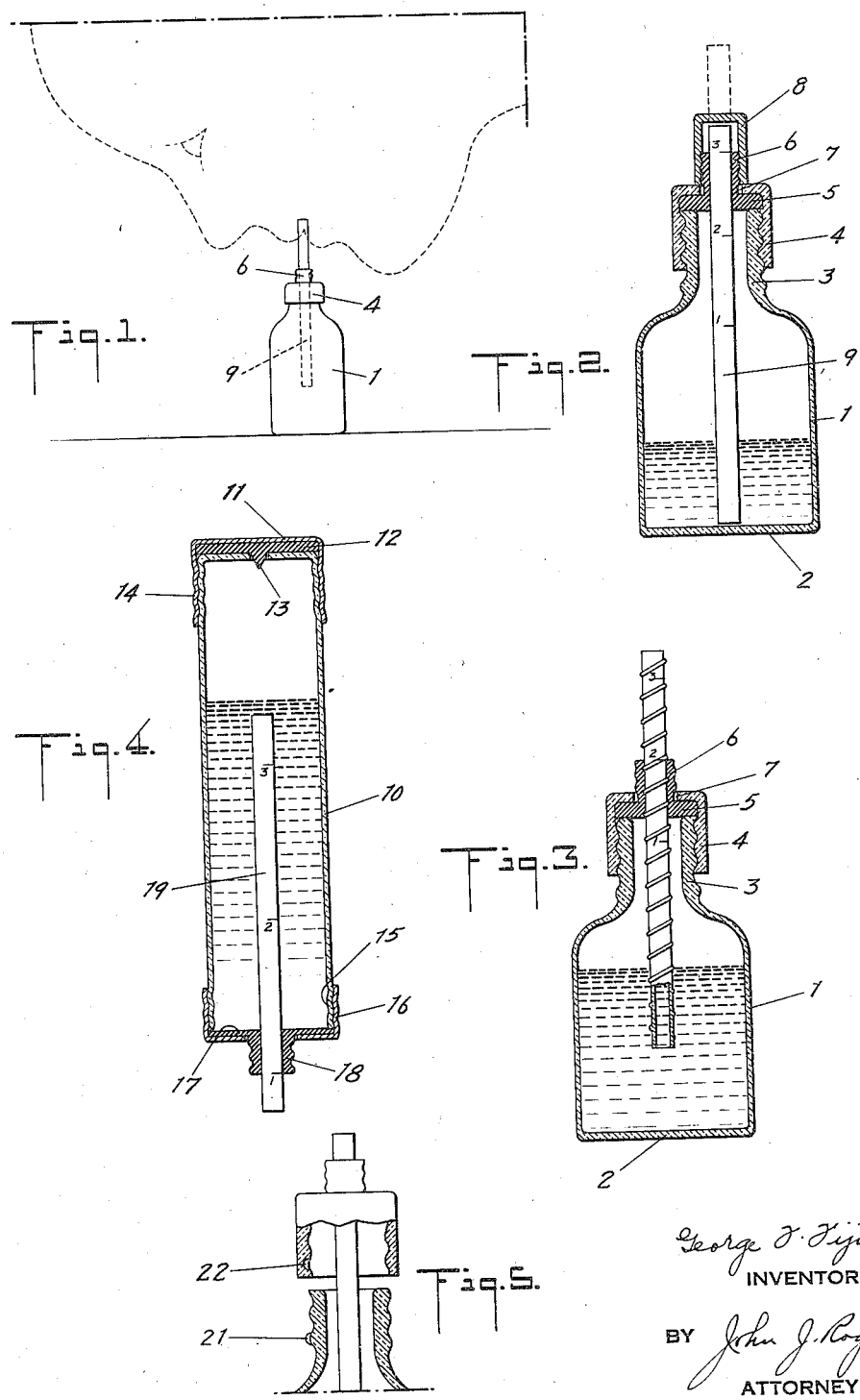

2,109,838

UNITED STATES PATENT OFFICE 2,109,838

MEDICINE DOSAGE CONTAINER

George F. Fijux, Laurelton, N. Y.

Application April 7, 1937, Serial No. 135,444

10 Claims. (Cl. 221—147)

This invention relates to containers and more especially to a container for liquid medicines or the like, whereby accurately determinable doses may be imbibed conveniently and safely.

Certain types of medicines are required to be taken in accurate quantities and many liquid medicines are generally measured in terms of teaspoon units. In many cases, it is not feasible or convenient to secure or carry a teaspoon for measuring purposes, and even when a teaspoon is available, it is often inconvenient to fill the teaspoon and imbibe the contents thereof without losing some. While various forms of measuring bottles have been proposed they may be roughly classified into those of the bulb or eye-dropper type, and those of the side-chamber type. The former are open to a number of objections amongst which are the unavoidably long glass tubing that is necessary to contain even a single teaspoon unit, and the danger of the medicinal contents being contaminated by contact with the rubber bulb. The latter or side-chamber type is quite complex in structure and expensive to fabricate. Furthermore with this latter type, the quantity that may be measured at one time is fixed by the cubical contents of the side-chamber.

I have found that a glass tube of the usual eye-dropper type provided with a rubber bulb, in order to be able to withdraw and contain even a single teaspoon unit, must be of unwieldy length, and certainly of a length which is not practical for carrying on the person, or in a handbag, purse or the like. Thus using ordinary eye-dropper tubing, it would be necessary to employ a length of tubing of approximately six or seven inches to contain a single teaspoon unit. If attempts are made to employ larger bore tubing of shorter length the rubber bulb must be of unwieldy dimensions to elevate the necessary quantity of liquid.

Accordingly, it is one of the principal objects of this invention to provide a medicinal carrier in the form of a bottle or the like, provided with a measuring tube arrangement which is of sufficiently small size as to enable the carrier and tube to be carried on the person or in a handbag, purse, or the like; and whereby accurately determinable dosages may be directly imbibed from the bottle without the necessity of employing a measuring spoon or other separate measuring device. As a result of this feature, one can carry the bottle in a clothes pocket with the assurance that no matter what the time or location, an accurate teaspoon unit or units of dosage may be taken.

A feature of the invention relates to a conveniently sized medicine carrier that is designed to contain a predetermined number of teaspoon units of liquid, in combination with a specially designed measuring and imbibing tube.

Another feature relates to a convenient personal liquid medicine carrier that can be easily filled by pouring from a larger bottle or container, and accurate dosages may be imbibed directly from the carrier without using a separate measuring device such as a teaspoon or the like.

A further feature relates to a measured dosage bottle for liquid medicine that can be easily and expeditiously dismantled for cleaning, sterilizing and similar purposes.

Another feature relates to a medicine bottle and imbibing tube whereby one or more teaspoon units may be directly imbibed from the bottle by the simple operation of locating the tube and siphoning just the right quantity directly into the mouth.

A still further feature relates to the novel organization, arrangement and proportioning of parts which go to make up a cheap, convenient and accurate dosage measuring medicine container.

Other features and advantages not specifically enumerated will be apparent after a consideration of the following detailed descriptions and the appended claims.

While the invention will be disclosed herein as embodied in certain specific forms it will be understood that this is done merely for explanatory purposes and not by way of limitation, accordingly in the drawing, Fig. 1 is a diagrammatic view of one form of measuring bottle according to the invention, showing the preferred manner of use thereof.

Fig. 2 is a vertical sectional view of the bottle of Fig. 1.

Fig. 3 shows a modification of Fig. 2.

Fig. 4 shows a modified form of measuring bottle according to the invention.

Fig. 5 is a detail of a locking cap.

Referring more particularly to Fig. 2, the numeral 1 represents a bottle of any suitable shape and cross-section, preferably, although not necessarily, having a flat bottom 2. The bottle is, in accordance with the invention, designed to contain a predetermined quantity, measured in teaspoon units, of medicine to be imbibed. For example the particular bottle shown is intended when full, to contain exactly three teaspoon units of liquid medicine. Preferably the neck 3 of the bottle is threaded in any well-known manner to receive a correspondingly internally threaded cap 4. Seated in the bottom of cap 4, and arranged to be clamped against the mouth of the bottle, is a rubber washer 5, preferably having integrally attached thereto a bushing 6 extending through an opening 7 in the cap. The outer face of bushing 6 is preferably threaded to receive the correspondingly threaded closure cap 8.

Arranged to pass through the bushing 6 and washer 5 is a measuring tube 9 preferably of glass and being of substantially the same diameter or even slightly larger diameter, than the normal diameter of the opening in washer 5, so that the tube can be retained frictionally in adjusted position. The parts are so proportioned that when the cap 4 is partially unthreaded or loose on the neck 3, the washer 5 is not compressed, thus permitting the measuring tube to be adjusted in a vertical direction. When the cap 4 is tightened it compresses washer 5 thus causing the measuring tube to be firmly locked in adjusted position.

The tube 9 is provided with suitable calibration marks or indicia as shown, each mark representing the position of the tube for the corresponding number of teaspoon units to be imbibed from the bottle. Thus normally when the device is not in use, and assuming the bottle has been previously filled with three teaspoon units of liquid, the cap 4 together with members 5 and 6 are assembled in place, and tube 9 is positioned with its lower end adjacent the bottom of the bottle, and closure cap 8 is tightened in place. When it is desired to imbibe a predetermined number of teaspoon units directly from the bottle, the cap 8 is removed, and cap 4 is partially unscrewed whereupon tube 9 is adjusted vertically to bring the appropriate indicia in registry with the top of member 6. It will be understood of course that some other fixed reference mark may be employed on the bottle rather than the top of member 6. When the tube 9 has been properly adjusted, the cap 4 is partially tightened to lock the tube in place while allowing access of air into the bottle. For example if three teaspoon units are to be imbibed, the tube 9 is adjusted to bring the indicia "3" opposite the top of member 6. The bottle is placed preferably on a suitable level support as indicated in Fig. 1 whereupon the protruding end of tube 9 is inserted into the mouth and suction exerted until no more liquid is withdrawn. If only two teaspoon units are desired, the tube 9 is adjusted to bring the indicia "2" in place, and likewise for a single teaspoon unit. It will be seen that in no case can more than the exact quantity of liquid be imbibed through tube 9, depending upon the previously adjusted position of said tube. It will be understood of course that tube 9 is calibrated in accordance with the height, width and shape of the bottle, due allowance being made for the displacement of liquid at different positions of the said tube.

Instead of providing a smooth wall tube 9, this tube may have its surface notched, or spirally grooved or threaded, as indicated in Fig. 3 so that its engagement with bushing 6 enables the vertical position of the tube to be adjusted merely by turning the same. A given number of turns may then represent a teaspoon unit, thus enabling the device to be used where there is insufficient light to see the indicia on the tube.

Referring to Fig. 4, there is shown a modification of the invention whereby the contents of the bottle are arranged to be imbibed directly not only by suction, but also by gravity. The device of Fig. 4 is shown in its upside-down position for imbibing, and is in the form of a bottle 10 having a small perforation 11 in its lower end. This perforation is arranged to be closed by a washer 12, preferably although not necessarily, having a small projection 13 registering with said perforation. The outer face of the bottle end is threaded to receive a correspondingly threaded cap 14 which when tightened effects a closing of the perforation 11 in a liquid-tight and air-tight manner. The bottle may be similar to the bottle of Fig. 2 having a threaded mouth and a corresponding threaded cap 16. A rubber washer 17 having an integral perforated bushing 18 is arranged to be clamped against the mouth of the bottle, and a measuring tube 19, similar to tube 9, passes through the bushing. A closure cap (not shown) similar to cap 8 is provided. In this embodiment, the tube 9, need not extend to the bottom of the bottle since the contents of the bottle are removed by gravity as well as by suction, by inverting the previously filled bottle to the position shown in Fig. 4. The manner of filling and using the bottle is as follows. The bottle is placed or held in an upright position with the cap 14 tightened in place, and with the members 16, 17, 18 removed. The bottle is then filled easily by pouring the medicine into the wide open mouth. The washer 17 is then placed in position and tube 19 is passed therethrough, whereupon the cap 16 is placed in position. The closure cap, corresponding to cap 8 of Fig. 2, is fastened in place, and the parts are so proportioned that when this closure cap is tightened the tube 19 is forced into the bottle in position to measure one teaspoon unit when the bottle is inverted as shown in Fig. 4. When it is desired to remove or imbibe the first teaspoon unit with the bottle in inverted position, the cap 14 is slightly loosened to break the vacuum. The outer closure cap having been removed, the projecting end of tube 19 is inserted into the mouth and exactly one teaspoon unit only, can be extracted. It will be noted that the liquid flows through tube 19 not only by suction, but also by reason of the atmospheric pressure through the perforation 11. If two teaspoon units are desired, the same procedure is followed except the tube 19 is pulled out to the second teaspoon mark, and likewise for the third teaspoon unit. Here again, if desired the outer surface of the bottle may be marked as by ribs to indicate the level of the liquid within the bottle.

While certain specific embodiments have been described, it will be understood that various changes and modifications may be made therein without departing from the spirit and scope of the invention. Thus as shown in Fig. 5 the end of the thread on the bottle neck may be provided with a small projection 21 which engages a corresponding recess 22 on the cap when the cap is tightened in place, thus preventing the cap becoming loose when carried on the person.

What I claim is:

1. A liquid dosage measuring and oral imbibing device comprising a bottle to contain a predetermined number of liquid units, a cap threaded on to said bottle, a measuring tube passing through said cap in an adjustable slidable manner, means including said cap to fasten the tube in adjusted position, said tube being calibrated in said liquid units and being open at its outer end for directly imbibing the proper number of liquid units from the bottle by oral suction through the tube.

2. A liquid dosage measuring and oral imbibing device of sufficiently small dimensions to enable it to be conveniently carried on the person, comprising a bottle having a threaded neck, a cap threaded on to said neck, a compressible washer clamped between said cap and the mouth of the bottle, and a tube passing through said washer for directly imbibing the contents of the bottle by oral suction through said tube, said tube being freely slidable through said cap when said cap is loosened, but being locked in adjusted position when said cap is tightened.

3. A liquid dosage measuring and oral imbibing device of sufficiently small dimensions to enable it to be conveniently carried on the person, comprising a bottle having a threaded neck, a perforated cap threaded on to said neck, a rubber washer to be clamped between said cap and the mouth of said bottle, a calibrated glass tube adjustably passing through said cap and washer when said cap is loosened, said cap being arranged when tightened to compress said washer to lock said tube in adjusted position.

4. A device according to claim 3 in which the washer is provided with an integral threaded bushing to receive a correspondingly threaded closure cap for closing off the open projecting end of said tube.

5. A device according to claim 1 in which the tube is provided with a series of spaced calibrated tube locating projections.

6. A device according to claim 1 in which the tube is provided with a helical groove on its surface.

7. A dosage measuring device comprising a bottle having a small opening in the bottom thereof, adjustable means carried by the bottle for closing said opening in a liquid-tight and air-tight manner, a cap carried by the upper end of said bottle, a measuring tube passing through said cap and frictionally held in said cap, said tube being calibrated in liquid units and having an outwardly projecting end to enable the contents of the bottle to be extracted directly by oral suction.

8. A device according to claim 7 in which the means for closing said opening includes a washer overlying said opening, and a threaded cap threaded onto the correspondingly threaded end of the bottle.

9. A device according to claim 7 in which the means for closing said opening includes a rubber washer having a small projection registering with said opening, and means to force said projection into said opening to close the same in an air-tight manner.

10. A device according to claim 7 in which the cap at the upper end of the bottle is provided with an integral bushing threaded on its outer face to receive a correspondingly threaded closure cap for closing off the projecting end of said tube when the device is not in use, and means to lock the cap against unscrewing.

GEORGE F. FIJUX.